(12) United States Patent
Myslowski et al.

(10) Patent No.: US 8,512,469 B2
(45) Date of Patent: Aug. 20, 2013

(54) POLYMERIC CONSTRUCTION MATERIAL ON THE BASIS OF FLOTATION WASTE FROM COPPER ORE FLOTATION AND WASTE SULFUR

(75) Inventors: Wlodzimierz Myslowski, Bielsko-Biala (PL); Andrzej Janiczek, Nowa Wies (PL)

(73) Assignee: Wlodzimierz Myslowski, Bielsko-Biala (PL)

( * ) Notice: Subject to any disclaimer, the term of this patent is extended or adjusted under 35 U.S.C. 154(b) by 0 days.

(21) Appl. No.: 13/700,424

(22) PCT Filed: Nov. 2, 2010

(86) PCT No.: PCT/PL2010/000107
§ 371 (c)(1),
(2), (4) Date: Dec. 7, 2012

(87) PCT Pub. No.: WO2011/149368
PCT Pub. Date: Dec. 1, 2011

(65) Prior Publication Data
US 2013/0074738 A1    Mar. 28, 2013

(30) Foreign Application Priority Data
May 28, 2010   (PL) .......................................... 391373

(51) Int. Cl.
*C04B 28/36* (2006.01)
*C04B 18/14* (2006.01)

(52) U.S. Cl.
USPC .......................................... 106/786; 106/815

(58) Field of Classification Search
USPC .................................................. 106/786, 815
See application file for complete search history.

(56) References Cited

U.S. PATENT DOCUMENTS 4,058,500 A * 11/1977 Vroom ........................... 523/219
4,348,313 A *  9/1982 McBee et al. ................. 524/788

FOREIGN PATENT DOCUMENTS

| PL | 340684 | 2/2001 |
| PL | 187091 | 5/2004 |
| PL | 189068 | 6/2005 |
| WO | 99/27018 | 6/1999 |
| WO | WO2010/082856 A1 * | 7/2010 |

OTHER PUBLICATIONS

Derwent-Acc-No. 2010-P12898, abstract of Chinese Patent Specification No. CN 101857389A (Oct. 2010).*
Derwent-Acc-No. 2012-L11880, abstract of Poliand Patent Specification No. PL 392406A1 (Mar. 2012).*

* cited by examiner

*Primary Examiner* — Anthony J Green
(74) *Attorney, Agent, or Firm* — Cherskov Flaynik & Gurda, LLC

(57) ABSTRACT

The method of production of polymeric construction material from flotation waste originating from copper ore flotation and waste sulfur is described. The method includes mixing of 20-50% by weight of waste sulfur which is combined with 10-50% by weight of flotation waste from flotation of copper ore and 3-25% by weight of waste phosphogypsum as pH regulator. Finally, 10-40% by weight of mineral filler is added. The mixing occurs at a temperature of 130-150 degrees Celsius and the mixing lasts for about 30 minutes with rotational speed of an agitator of 20 rpm.

9 Claims, No Drawings

POLYMERIC CONSTRUCTION MATERIAL ON THE BASIS OF FLOTATION WASTE FROM COPPER ORE FLOTATION AND WASTE SULFUR

CROSS REFERENCE TO RELATED APPLICATIONS

This application claims the benefit as a nationalization of PCT Application PCT/PL10/00107, filed on Nov. 2, 2010, currently pending, which turn claims priority to Polish Utility Application No. P-391373, filed on May 28, 2010, presently pending, the contents of which are herein incorporated by reference.

DETAILED DESCRIPTION

The object of the invention is polymeric construction material on the basis of flotation waste from copper ore flotation and waste sulfur.

Manufactured polymeric construction material is a material similar to traditional concrete but of better functional properties such as: high resistance to compression and bending, short setting time, low absorbability, good tightness and, above all, resistance to acidic environments to which most of construction materials are not resistant.

There are known methods of production of sulfur binders: U.S. Pat. Nos. 4,058,500 and 4,348,313 demonstrate sulfur binder where sulfur is modified with olefin hydrocarbons, that is, an organic modifier. The same, sulfur binders manufactured in Poland are based on organic modifiers of olefin hydrocarbon type. Such solutions are dangerous in use due to the risk of fire or explosion during the modification process. Another disadvantage is their toxic effect on personnel.

The most important quality of the new solution "Polymeric construction material on the basis of flotation waste from copper ore flotation and waste sulfur" is that waste sulfur, waste from copper flotation in KGHM Polska Miedź S.A. and waste phosphogypsum as flotation waste pH regulator are used in the production process.

It affects reduction of the accumulated noxious waste amounts and allows to utilize them in an environmentally safe way. Polymeric construction material according to the invention is obtained by adding dried flotation waste from copper ore flotation to waste sulfur in liquid state at the temperature of 130-150° C. with simultaneous mixing of these ingredients.

Flotation waste has a pH value of about 8.5, that is why it is subjected to a pH regulation process with the use of waste phosphogypsum reducing the waste to pH of about 6.0, that is, to slightly acid reaction. Flotation waste from flotation of copper ore in KGHM Polska Miedź S.A. possess composition depending on the type of floated ore; however, they all are suitable for modification of waste sulfur due to fine crushing and metals contained in them, which appear in the form of simple or mixed sulfides.

And so copper occurs in the form of chalcocite—$CU_2S$, bornite—$Cu_5FeS_4$, chalcopyrite—$CuFeS_2$, covellite—$CuS$, lead occurs mostly in the form of galena—$PbS$, and zinc and nickel in the form of sulfides and silicates.

Flotation waste contains some amounts of trace elements such as Cu, Pb, Fe, AS, Cd, Zn, Ni, Mo, Co and V; moreover, post-flotation waste contain about 13% by weight of CaO, about 5% by weight of MgO. The ingredients specified above constitute the mixture of sulfur modifiers; moreover, about 40% by weight of $SiO_2$, 29% by weight of dolomite, about 7% by weight of calcite, which are good mineral filler for the polymeric construction material obtained according hereto can be found in waste. Sulfur, as an element of a remarkably electronegative character, reacts vigorously with metals. Copper is already in reaction with sulfur at room temperature and in increased temperatures sulfur combines with almost all elements. Moreover, flotation waste from copper ore flotation has got pH of about 8.5 in contrast to blast-furnace slag from steel smelting where pH amounts to 10.5; it is very significant in the process of sulfur modification, since it is easier to obtain pH lower than 7 with the use of waste phosphogypsum, that affects favorably the modification itself and the properties of polymeric construction material formed on the basis hereof. In specific technical conditions, that is, at high temperature, destruction of closed rings from sulfur atoms into open chains resulting from opening of these rings at temperatures higher in the temperature range of 130-50° C., occurs. In the temperature range of 130-150° C. sulfur $S_x$ cyclic structure dominates in place of the rhombic structure.

Metals such as copper, lead, zinc, nickel, contained in flotation waste from copper ore flotation, which occur in the form of simple or mixed sulfides and some amounts of trace elements such as copper, lead, iron, arsenic, cadmium, zinc, nickel, molybdenum, cobalt and vanadium, which are sulfur modifiers, undergo copolymerization reaction with chain-structured sulfur creating a copolymer of highly-molecular compound properties which occurs in polymeric materials. Polymeric construction material on the basis of flotation waste from copper ore flotation and waste sulfur being the object of the invention comprises: 20-50% by weight of waste sulfur, 10-50% by weight of flotation waste from copper ore flotation in KGHM Polska Miedź S.A. of granulation of about 0.06 mm comprising about 13% by weight of CaO, about 5% by weight of MgO, about 40% by weight of $SiO_2$, about 29% by weight of dolomite, about 7% by weight of calcite, some amounts of metals such as copper, lead, zinc, nickel in the form of simple or mixed sulfides, and some amounts of trace elements such as copper, lead, iron, arsenic, cadmium, zinc, nickel, molybdenum, vanadium and cobalt mixed with pH regulator of flotation waste which is waste phosphogypsum, as a result of which a change of pH of the flotation waste from alkaline to slightly acid reaction occurs.

Waste sulfur is loaded to a horizontal mixer heated by heating oil, and after it is melted, previously weighed amounts of dried floatation waste mixed beforehand with pH regulator, which is waste phosphogypsum in the amount of 3-25% by weight, are dosed. In the mixer, at the temperature of 130-150° C. at constant mixing of about 20 rpm, modification of chain sulfur with the use of metals and their sulfides contained in flotation waste from copper ore flotation, occurs. Copolymer of highly-molecular compound properties is formed. Polymeric construction material, which, depending on needs, can be poured into a mold or poured onto a specified surface, mainly for road foundations in place of concrete on the basis of traditional cements, or used for production of road surface mixes, is obtained by adding specific amounts of mineral fillers in the amount of 10-40% by weight to the mixer. Construction material in the above version intended for a mold or for pouring onto a specified surface differs in its percentage composition from polymeric construction material intended for production of road surface mixes on the basis of road asphalts and polymeric construction material intended for repair and production of new road surfaces. The amount of mineral filler is reduced in it to 10% by weight of granulation of 0-1 mm.

Addition of proper amount of polymeric construction material on the basis of flotation waste from copper ore flotation and waste sulfur to surface road mixes reduces the amount of road asphalt in these surfaces by about 3% by weight, and thus, reduces costs of road construction. Additionally, polymeric construction material increases the temperature of road surface softening, preventing its rutting, that extends the time of road service life. Polymeric construction material on the basis of flotation waste from copper ore flotation and waste sulfur possesses very good functional properties, that is, compression strength of about 50-60 MPa, much higher than that of traditional concretes, breaking strength of about 6 MPa, bending strength of about 8 MPa, low water absorbability of about 1%, good frost resistance and proper roughness, resistance to sea salt, acids and oils. Polymeric construction material has excellent adhesion to the ground and to construction materials used in highway engineering. It is used for production of road foundation and road binder.

Furthermore, it fills cracks and hollows of concrete and road surfaces tightly. Compounds of copper, magnesium and iron contained in polymeric construction material are inhibitors of hydrogen sulfide emission at mixing of polymeric construction material with asphalt that improves industrial safety during preparation of road mixes. Unexpected properties of such big improvement of mechanical compressive strength, resistance to aggressive media, i.e., acids, salts, oils in comparison to concrete on the basis of Portland cement and ability to form road mixes are due to flotation waste from copper ore flotation, which is a source of metals such as copper, lead, zinc, nickel in the form of simple or mixed sulfides and some amount of trace elements such as copper, lead, iron, arsenic, cadmium, zinc, nickel, molybdenum, vanadium, cobalt, which are sulfur modifiers.

As a result of heating up sulfur, cyclic sulfur decomposes into simple chains, which with modifiers contained in flotation waste from copper ore flotation form a copolymer of linear or cross-linked structure of typical properties of a highly-molecular compound which occurs in polymeric materials. The flotation waste from copper ore flotation in KGHM Polska Miedz S.A. contains about 13% by weight of CaO, about 5% by weight of MgO, about 40% by weight of $SiO_2$, about 29% by weight of dolomite, about 7% by weight of calcite, some amounts of metals such as copper, lead, zinc, nickel in the form of simple or mixed sulfides and some amounts of trace elements such as copper, lead, iron, arsenic, cadmium, zinc, nickel, molybdenum, vanadium, cobalt. Waste phosphogypsum is the waste from industrial production of phosphatic fertilizers. Waste sulfur is a product of natural gas or crude oil desulfurization.

The method of production of polymeric construction material on the basis of flotation waste from copper ore flotation and waste sulfur according to the invention has been defined more closely in the example of embodiment.

EXAMPLE I

Polymeric construction material on the basis of flotation waste from copper ore flotation and waste sulfur:

| | |
|---|---|
| Waste sulfur | 30% |
| Flotation waste | 35% |
| Waste phosphogypsum as pH regulator | 5% |
| mineral filler 0-10 mm or waste slag 0-10 mm from copper smelting | 30% |

Prepared in the following way: weighed amounts of waste sulfur are delivered to the horizontal mixer. This mixer is heated indirectly with heating oil. The mixer possesses a rotating agitator of 20 rpm. At the temperature of 130-150° C., when all the sulfur assumes liquid form, weighed amounts of flotation waste, mixed beforehand with pH regulator which is waste phosphogypsum, are dosed to the mixer. At the temperature of 130-150° C. in the molten sulfur zone a contact of flotation waste with liquid sulfur occurs. Mixing of ingredients lasts for about 20 minutes. The process of modification of waste sulfur with flotation waste from copper ore flotation by metals and sulfides contained it in, including copper, lead, zinc, nickel, iron, arsenic, cobalt, molybdenum, cobalt and vanadium, occurs. After 20 minutes of the modification process, mineral material or waste slag from copper smelting as a filler is added to the mixer and it is mixed for about 10 minutes. Thus, polymeric construction material on the basis of flotation waste from copper ore flotation and waste sulfur with the addition of mineral filler or waste slag from copper smelting, which is poured from the mixer to a mold or onto a specified surface, a road foundation included, is formed. The material produced this way is grey, possesses high mechanical compressive strength of 50-60 MPa and resistance to acids, oils and salts.

EXAMPLE II

Polymeric construction material on the basis of flotation waste from copper ore flotation and waste sulfur

| | |
|---|---|
| Waste sulfur | 50% |
| Flotation waste | 25% |
| Waste phosphogyspum as pH regulator | 20% |
| Mineral filler from 0-1 mm | 5% |

The method of preparation identical as in Example I; the difference is that polymeric construction material is directed from the mixer to granulation. Granulate, after mixing with road asphalt, is used to prepare the road binder used in production of road surfaces of increased softening temperature and high resistance to rutting.

Composition of the binder: road asphalt 20% by weight, polymeric construction material 80% by weight.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The embodiment of the invention in which an exclusive property or privilege is claimed is defined as follows:

1. The method of production of polymeric construction material from flotation waste originating from copper ore flotation and waste sulfur, said method comprising mixing of 20-50% by weight of waste sulfur, 10-50% by weight of flotation waste from flotation of copper ore, 3-25% by weight of waste phosphogypsum as pH regulator, 10-40% by weight of mineral filler;

wherein said mixing occurs at a temperature of 130-150 degrees Celsius and wherein said mixing lasts for about 30 minutes with rotational speed of an agitator of 20 rpm.

2. The method of claim 1 wherein said copper ore comprises copper ore having granulation of 0.06 mm.

3. The method of claim 1 wherein said polymeric construction material further comprises waste sulfur with metals contained in flotation waste from copper ore flotation, wherein said metals include copper, lead, zinc, nickel in the form of simple or mixed sulfides.

4. The method of claim 3 wherein said polymeric construction material further comprises amount of trace elements, wherein said trace elements include copper, lead, iron, arsenic, cadmium, zinc, nickel, molybdenum, vanadium, cobalt.

5. The method of production of polymeric construction material from flotation waste originating from copper ore flotation and waste sulfur, said method comprising mixing of 30% by weight of waste sulfur, 35% by weight of flotation waste from flotation of copper ore of granulation of about 0.06 mm, 5% by weight of waste phosphogypsum as pH regulator, 30% by weight of mineral filler wherein said mixing occurs at a temperature of 130-150 degrees Celsius and wherein said mixing lasts for about 30 minutes with rotational speed of an agitator of 20 rpm.

6. The method of claim 5 wherein said copper ore comprises copper ore having granulation of 0.06 mm.

7. The method of production of polymeric construction material from flotation waste originating from copper ore flotation and waste sulfur, said method comprising mixing of 50% by weight of waste sulfur, 25% by weight of flotation waste from flotation of copper ore, 20% by weight of waste phosphogypsum as pH regulator, 5% by weight of mineral filler wherein said mixing occurs at a temperature of 130-150 degrees Celsius and wherein said mixing lasts for about 30 minutes with rotational speed of an agitator of 20 rpm.

8. The method of claim 7 wherein said copper ore comprises copper ore having granulation of 0.06 mm.

9. The method of claim 7 wherein said mineral filler comprises filler of size not exceeding 1 mm.

* * * * *